(12) United States Patent
Hobbs

(10) Patent No.: US 12,638,747 B2
(45) Date of Patent: *May 26, 2026

(54) MOTORIZED CAMERA HEAD WITH PCB MOTORS

(71) Applicant: Nodal Film Systems LLC, Los Angeles, CA (US)

(72) Inventor: Boyd Randolph Hobbs, Los Angeles, CA (US)

(73) Assignee: Nodal Film Systems LLC, Los Angeles, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 18/355,707

(22) Filed: Jul. 20, 2023

(65) Prior Publication Data

US 2024/0027875 A1 Jan. 25, 2024

Related U.S. Application Data

(63) Continuation-in-part of application No. 18/338,158, filed on Jun. 20, 2023, and a continuation-in-part of
(Continued)

(51) Int. Cl.
| | |
|---|---|
| *G03B 5/00* | (2021.01) |
| *H02K 41/06* | (2006.01) |
| *H04N 23/68* | (2023.01) |

(52) U.S. Cl.
CPC .............. *G03B 5/00* (2013.01); *H02K 41/06* (2013.01); *H04N 23/685* (2023.01); *G03B 2205/0023* (2013.01); *G03B 2205/0069* (2013.01)

(58) Field of Classification Search
None
See application file for complete search history.

(56) References Cited

U.S. PATENT DOCUMENTS

| | | | |
|---|---|---|---|
| 9,673,684 B2 | 6/2017 | Shaw | |
| 9,673,688 B2 | 6/2017 | Shaw | |

(Continued)

FOREIGN PATENT DOCUMENTS

| | | |
|---|---|---|
| CN | 114788252 A | 7/2022 |
| DE | 102015115676 A1 | 3/2017 |

(Continued)

OTHER PUBLICATIONS

Hed, New Concepts for PTR Functionality in Fixed Domes, Master Thesis, Division of Product Development, Department of Design Sciences Faculty of Engineering LTH, Lund University, 2016. (Year: 2016).

(Continued)

*Primary Examiner* — Rodney E Fuller
(74) *Attorney, Agent, or Firm* — Lynch LLP

(57) ABSTRACT

A camera stabilization system includes printed circuit board (PCB) stator motors configured with rotors that define slots for receiving PCB stators. The rotors are surrounded by wheel-based bearings that enable smooth rotation when activated by a motor controller. An annular roll motor with an open center portion is coupled with one or more tilt motors and a pan motor to form a compact camera head system. The configuration allows a camera to be at least partially disposed within the roll motor's interior space, facilitating active stabilization and precise control.

10 Claims, 8 Drawing Sheets

Related U.S. Application Data application No. 17/869,601, filed on Jul. 20, 2022, now Pat. No. 12,259,643.

(56) References Cited

U.S. PATENT DOCUMENTS

| | | |
|---|---|---|
| 9,800,109 B2 | 10/2017 | Shaw |
| 9,859,763 B2 | 1/2018 | Shaw |
| 10,170,953 B2 | 1/2019 | Shaw |
| 10,211,694 B1 | 2/2019 | Shaw |
| 10,256,690 B2 | 4/2019 | Shaw |
| 11,005,322 B2 | 5/2021 | Milheim et al. |
| 11,121,614 B2 | 9/2021 | Shaw |
| 11,336,130 B1 | 5/2022 | Shaw et al. |
| 11,527,933 B2 | 12/2022 | Shaw et al. |
| 11,855,484 B2 | 12/2023 | Milheim et al. |
| 12,259,643 B2 * | 3/2025 | Hobbs .................... H02K 21/24 |
| 2004/0169434 A1 * | 9/2004 | Washington ........... H01R 39/24 |
| | | 310/232 |
| 2004/0184798 A1 | 9/2004 | Dumm |
| 2007/0053681 A1 | 3/2007 | Arbuckle |
| 2010/0128122 A1 | 5/2010 | Wright |
| 2014/0216023 A1 | 8/2014 | Rabhi |
| 2014/0218603 A1 | 8/2014 | Stone |
| 2015/0084446 A1 | 3/2015 | Atar |
| 2017/0241589 A1 | 8/2017 | Wang et al. |
| 2017/0317558 A1 | 11/2017 | Steg et al. |
| 2017/0363932 A1 | 12/2017 | Lim et al. |
| 2018/0123412 A1 | 5/2018 | Karplus et al. |
| 2018/0266621 A1 | 9/2018 | Zhang et al. |
| 2018/0283601 A1 | 10/2018 | Wei |
| 2019/0063668 A1 | 2/2019 | Wei |
| 2019/0074747 A1 | 3/2019 | Shukla |
| 2019/0161208 A1 | 5/2019 | Sun et al. |
| 2020/0014316 A1 | 1/2020 | Hobbs |
| 2020/0116195 A1 | 4/2020 | Chen et al. |
| 2020/0145577 A1 | 5/2020 | Enke et al. |
| 2021/0135549 A1 | 5/2021 | Lee et al. |
| 2021/0218304 A1 | 7/2021 | Schuler et al. |
| 2021/0387580 A1 | 12/2021 | Canones Bonham |
| 2022/0357639 A1 | 11/2022 | Rubens |
| 2023/0042319 A1 | 2/2023 | Brahmavar |
| 2023/0216363 A1 | 7/2023 | Hobbs |
| 2023/0353000 A1 | 11/2023 | Anvari et al. |

FOREIGN PATENT DOCUMENTS

| | | | |
|---|---|---|---|
| EP | 3035076 B1 | | 8/2020 |
| JP | 06022519 A | * | 1/1994 |
| JP | 2015154541 A | * | 8/2015 |
| WO | 2015039047 A1 | | 3/2015 |
| WO | 2018064831 A1 | | 4/2018 |
| WO | 2018157591 A1 | | 9/2018 |
| WO | 2022141451 A1 | | 7/2022 |

OTHER PUBLICATIONS https://pcbmotor.com/wp-content/uploads/2018/05/PCBMotor-Optical-world-_-1.8.pdf.

* cited by examiner

MOTORIZED CAMERA HEAD WITH PCB MOTORS

This application is a continuation-in-part and claims priority to U.S. patent application Ser. No. 18/338,158, filed Jun. 20, 2023 and to U.S. patent application Ser. No. 17/869,601, filed Jul. 20, 2022. All extrinsic materials identified in this application are incorporated by reference in their entirety.

FIELD OF THE INVENTION

The field of the invention is image stabilization and control systems.

BACKGROUND

The background description includes information that may be useful in understanding the present invention. It is not an admission that any of the information provided in this application is prior art or relevant to the presently claimed invention, or that any publication specifically or implicitly referenced is prior art.

In the field of camera control and stabilization, it can be advantageous to configure a system such that the axes of rotation roughly coincide with the camera's image sensor. Existing camera systems that attempt to solve this problem include overly complex mechanical systems that use, e.g., belt or chain drives to transfer mechanical energy to ring-shaped rotating mechanisms. That added complexity creates more opportunities for part failures, while also increasing the overall weight of the system.

Many systems like these are operated by individual camera operators who wear the system as a part of a larger camera rig. Thus, overall weight of the system has an impact on operator fatigue. Reductions in system weight can therefore result in longer shoots with less fatigue, and it can make it possible for camera operators with less physical strength to operate such systems.

By configuring camera systems such that the axes of rotation roughly coincide with the image sensor of the camera, images can be stabilized more easily, and movements of the camera can be more precise. Existing systems fail to contemplate solutions that implement printed circuit board (PCB) motors that make it possible to mount a camera within the motor itself. This reduces weight, reduces complexity, and brings about the desired effects without any of the traditional tradeoffs.

Thus, there is still a need in the art for improved camera operation and stabilization systems.

SUMMARY OF THE INVENTION

The present invention provides apparatuses, systems, and methods directed to camera head systems that feature PCB stator motors. In a first aspect of the inventive subject, a camera head system comprises: a roll motor configured as an annulus having an open center portion, where the roll motor comprises a printed circuit board (PCB) roll motor stator and a roll motor rotor; where the roll motor rotor extends at least partially into the open center portion; a tilt motor, where the tilt motor comprises a PCB tilt motor stator; where the tilt motor is coupled with the roll motor by a tilt motor mounting frame; a pan motor, where the pan motor comprises a PCB pan motor stator; and where the pan motor is coupled with the tilt motor by a pan motor frame.

In some embodiments, the roll motor rotor has a slot into which the roll motor PCB stator extends. The roll motor rotor can be enabled to rotate by a set of bearings mounted within the roll motor and disposed circumferentially around the roll motor rotor. Each bearing of the set of bearings can be configured as a track wheel that is sized and dimensioned to receive an exterior edge of the roll motor rotor. In some embodiments, the tilt motor is adjustably coupled with the tilt motor mounting frame.

In another aspect of the inventive subject matter, a camera head system comprises: a roll motor having a roll motor rotor and a printed circuit board (PCB) roll motor stator, where the roll motor rotor is formed as an annulus to create an open center portion; a tilt motor, where the tilt motor comprises a PCB tilt motor stator; where the tilt motor is coupled with the roll motor; a pan motor, where the pan motor comprises a PCB pan motor stator; and where the pan motor is coupled with the tilt motor by a pan motor frame.

In some embodiments, the roll motor rotor is at least partially disposed within a roll motor casing, and the roll motor rotor can include a slot into which the roll motor PCB stator extends. In some embodiments, the roll motor rotor is enabled to rotate by a set of bearings mounted within the roll motor and disposed circumferentially around the roll motor rotor. Each bearing of the set of bearings can be configured as a track wheel that is sized and dimensioned to receive an exterior edge of the roll motor rotor. In some embodiments, the tilt motor is adjustably coupled with the roll motor by a tilt motor mounting frame. The system can also include a second tilt motor attached to an opposite side of the roll motor from the first tilt motor.

One should appreciate that the disclosed subject matter provides many advantageous technical effects including minimized form factor, improved weight distribution, direct drive motor in a compact package, high torque output, and the creation of a large space in the center of a motor that to accommodate a camera.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWING

FIG. 13 shows a tilt motor from an interior perspective, showing tilt motor rotor mounted around at least one interior ball bearing.

FIG. 14 shows the same tilt motor in FIG. 13 from an exterior perspective.

FIG. 15 shows the tilt motor in FIG. 15 with tilt motor control PCB removed.

DETAILED DESCRIPTION

Figures 1, 2:
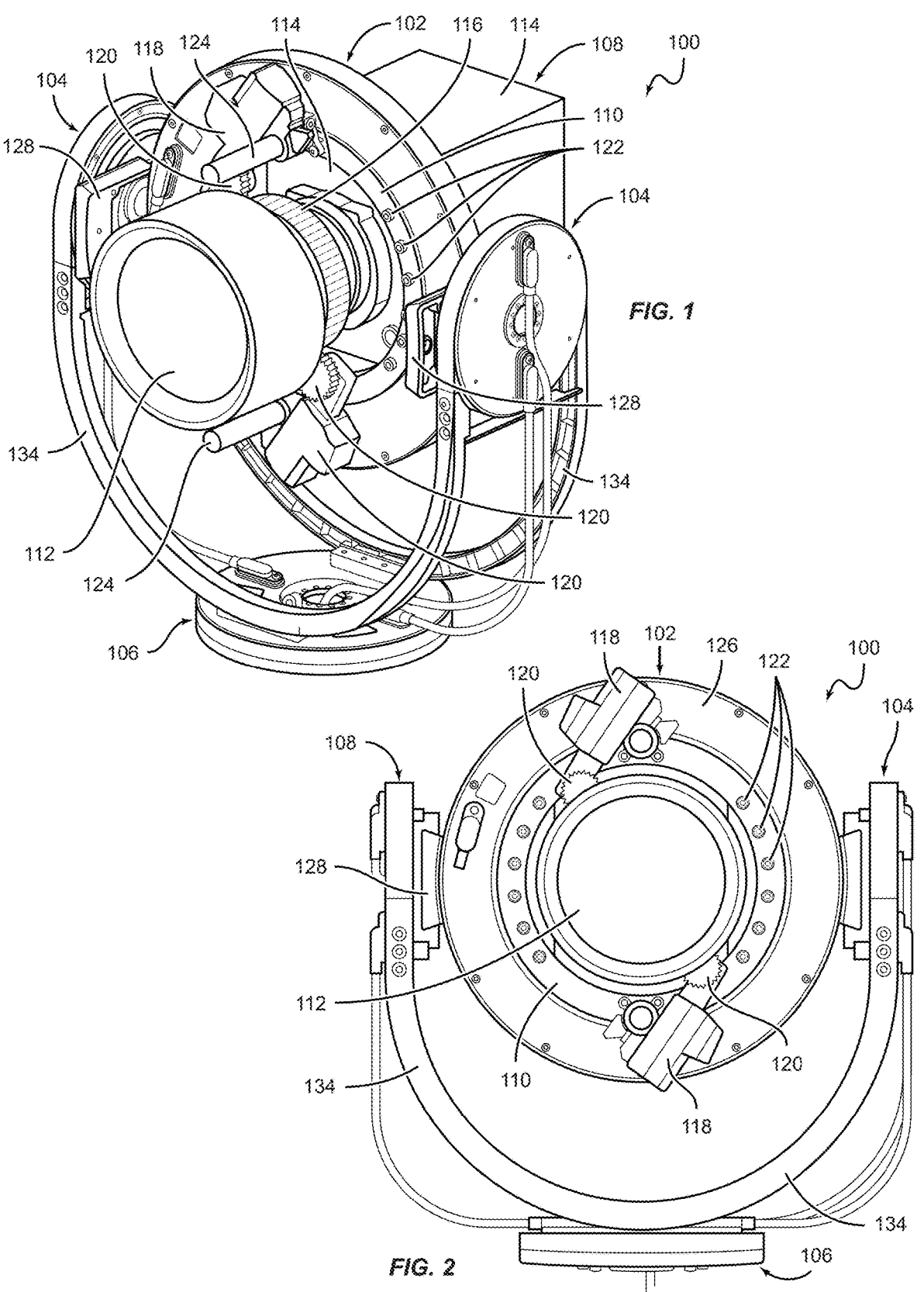
FIG. 1 shows an isometric view of a camera system.
FIG. 2 shows a front view of a camera system.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer, computing device, microprocessor, or the like should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

The inventive subject matter is directed to camera control and stabilization systems that use printed circuit board (PCB) stator motors to bring about a stabilized head for camera control (e.g., either a fluid head for manual manipulation or a remote head for electronic control). Systems can be used as remote heads, as gimbals, as an actively stabilized camera mounts, and so on. In some embodiment, a camera can be integrated into the system, while in other embodiments, a camera can be coupled with the system.

Systems of the inventive subject matter are configured to operate with cameras that are mounted or otherwise incorporated in a middle portion of an annular roll motor. The roll motor is then further coupled with two tilt motors by a set of adjustable mounting brackets. The tilt motors are themselves coupled with a pan motor that acts as a base. Embodiments use PCB stator motors to create haptic feedback during direct manipulation, for camera stabilization, to facilitate remote operation, and so on. PCB stator motors are known for thinner form factors, high torque, low incidence of cogging, and so on. No other motor type features an open center that is surrounded by the rotor and stator of the motor, and thus PCB stator motors are uniquely capable of making the configurations disclosed in this application possible. Indeed, no other motor type features an open center with as strong a ratio of bore diameter to motor thickness as PCB stator motors. Although it may be technically possible for other motor types to be configured to include an open center portion (e.g., an open area that is surrounded by an annular rotor), any other motor type besides a PCB stator motor would impart such significant drawbacks as to render those motors useless when implemented into devices like those described in this application.

Embodiments of the inventive subject matter are designed to be symmetrically balanced. In other words, systems are designed such that a pan axis of rotation, a tilt axis of rotation, and a roll axis of rotation all intersect at roughly a center of the annular roll motor. This balance can be achieved even before a camera is integrated into such a system.

In some embodiments, all motor subsystems (e.g., roll, tilt, and pan) are designed so that the center of gravity of each subsystem exists on its associated axis of rotation. Thus, in embodiments where each motor subsystem's center of gravity roughly coincides with the centers of gravity of the other motor subsystems, and where each center of gravity exists on an axis of rotation for its associated subsystem, then each axis of rotation for the roll, tilt, and pan motors intersect at roughly the same point in the center of the roll motor. By configuring systems in this way, the process of balancing a system once a camera has been added becomes simpler and requires only balancing the camera itself as opposed to balancing both the camera and the camera system.

In some embodiments, a camera can be mounted such that a center axis of the lens (e.g., an axis running through the center of the circular lens components) is aligned with the roll axis. In addition to being optically beneficial, aligning the camera such that the lens axis coincides with the roll axis means that the camera needs only to be adjusted forward or backward along the roll axis to balance about both the tilt and pan axes, too. This need gives rise to the inclusion of tilt motor mounting frames to facilitate adjustment of camera position along the roll axis.

By creating a system that positions a lens axis of a mounted camera along a roll axis of the system, lenses—whose center of gravity exists along the lens axis (i.e., because lenses are formed roughly as cylinders)—can be easily swapped out. When changing a lens, a camera that the lens is attached to may become unbalanced about the tilt and pan axes such that adjusting the camera's position along the roll axis (e.g., by changing the position of the camera along the tilt motor mounting frames) is necessary to bring the system back into balance. Embodiments of the inventive subject matter facilitate all these actions and adjustments and are purposefully designed to improve the user experience from these perspectives.

FIGS. 1 and 2 shows camera system 100 having a roll motor 102, two tilt motors 104, a pan motor 106, and a camera 108. Roll motor 102, tilt motors 104, and pan motor 106 are all PCB stator motors, which are implemented for their ability to generate high torque and for their unique configurations (e.g., they are thinner, lighter, and can be formed into annular shapes). Specifically, roll motor 102 is configured in a ring shape with an open center, which is configured to accommodate camera 108.

Camera 108 is coupled with roll motor rotor 110. Camera 108 includes a lens 112 that is attached to camera body 114. Where lens 112 mates with camera body 114, lens 112 includes a lens gear 116 that can be rotated to change physical properties of the lens such as focal length, iris, and focus distance. The system thus includes mounts for two or three lens motors 118, which are mounted to roll motor rotor 110. Each lens motor 118 includes a lens motor pinion 120, which are both enmeshed with lens gear 116. By rotating lens motors 118, lens gear 116 turns, which in turn changes physical properties of lens 112.

Roll motor rotor 110 thus includes fasteners 122 that are included to attach camera body 114 to roll motor rotor 110, and roll motor rotor is also configured to couple with lens motor mounting rods 124. Mounting rods 124 are configured to give lens motor 118 attachment points, where each lens motor 118 includes a collar that can be tightened around each mounting rod 124.

Thus, camera 108 mounted to roll motor rotor 110 can be caused to roll by roll motor 102. In some embodiments, camera system 100 is configured to be controlled by hand (e.g., functioning as a gimbal or adjustable by manual manipulation). In embodiments where camera system 100 is used as a gimbal, roll motor 102 can ensure a camera remains level along its roll axis or to control roll while accounting for roll resulting from the camera operator's movements, and in embodiments where camera system 100 is mounted to a stationary structure, roll motor 102 can be used to control roll (e.g., either remotely or by manual manipulation). Tilt motors 104 function similarly though about the tilt axis and pan motor 106 does the same about the pan axis.

FIGS. 1 and 2 also show roll motor body 126. Roll motor body 126 surrounds roll motor rotor 110, and roll motor body 126 provides a structure to which a PCB stator can be fixedly coupled. On opposite sides of roll motor 102 are tilt motors 104. Each tilt motor is coupled with roll motor 102 by a mounting frame 128 that couples with roll motor body 126. Mounting frame 128 provides a structure to which tilt motors 104 can attach, and each mounting frame 128 is configured such that each tilt motor 104 can slide along mounting frame 128 before being tightened in place. Sliding the tilt motors 104 along mounting frames 128 allows the axis rotation of the tilt motors 104 to be moved to a desired location. This also allows a user to balance the weight of camera 108 with attached lens 112 such that the center of mass between those two components is roughly aligned with the axis of rotation of the tilt motors 104, or so that a user can, as another example, mount a camera such that the tilt axis of rotation is roughly aligned with the camera's image sensor.

Pan motor 106 is coupled with tilt motors 104 via pan motor frame 134. Pan motor frame 134 couples with pan motor casing while pan motor rotor can be set on, or mounted to, a mounting surface, a vehicle, or any other component or structural element that system 100 should be enabled to pan while mounted to.

Figures 3, 4, 5:
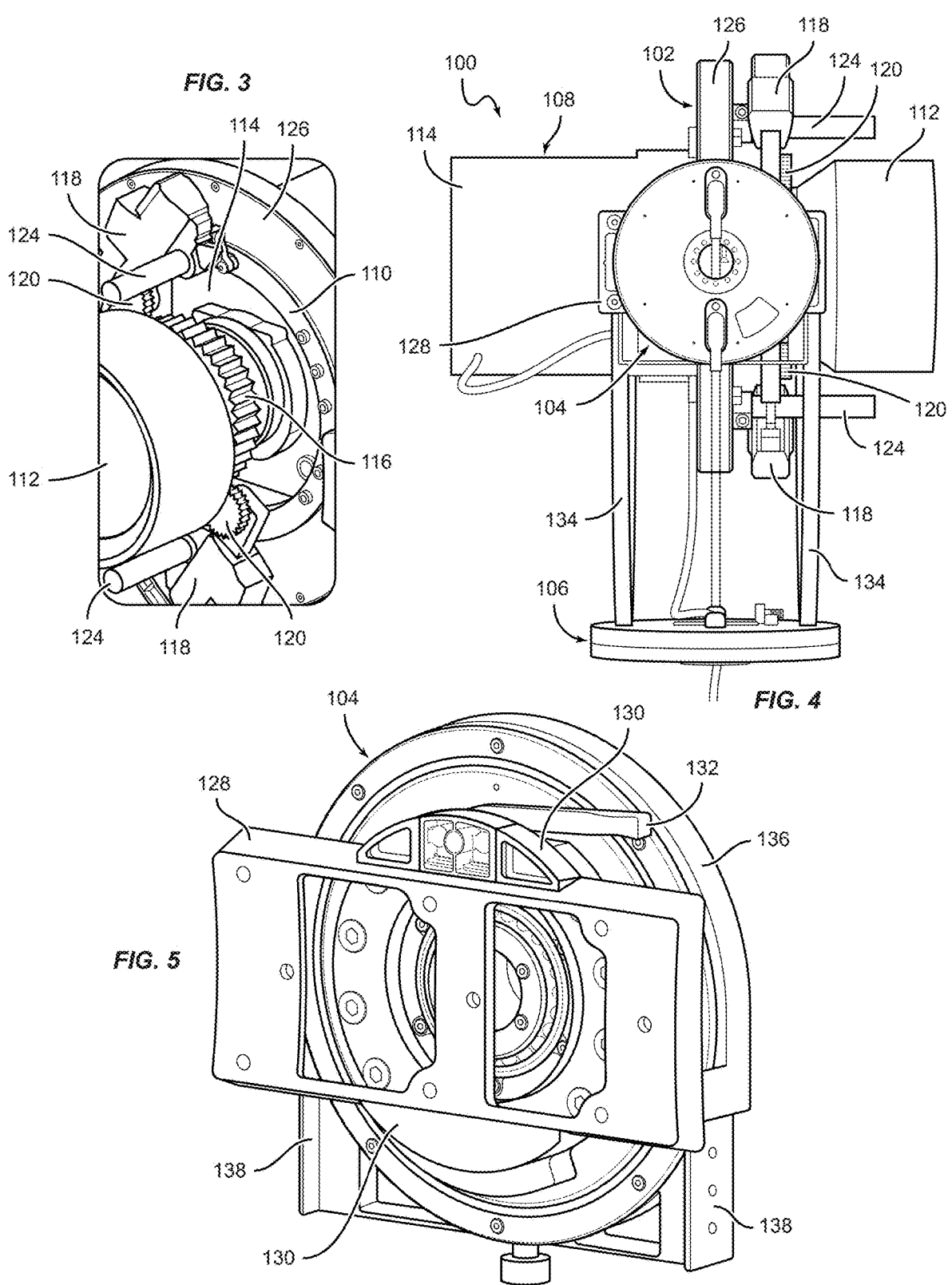
FIG. 3 shows a closer view of lens motors.
FIG. 4 shows a side view of a camera system.
FIG. 5 shows a tilt motor with its associated mounting frame.

FIG. 3 shows a closer view of lens motors 118. This view shows how lens motors 118 interact with lens gear 116. FIG. 3 also shows closer views of several other components described above, including roll motor body 126, roll motor rotor 110, camera body 114, lens motor mounting rods 124, and so on.

FIG. 4 shows a side view of camera system 100. From this view, the balance of camera 108 with attached lens 112 can be seen. The tilt axis of rotation runs through the center of tilt motor 104 (e.g., into the page, as drawn in FIG. 4). From this view, the pan axis of rotation runs vertically, and the roll axis of rotation runs horizontally. Mounting frame 128 is shown disposed between roll motor 102 and tilt motor 104. Each axis of rotation (e.g., roll, pan, and tilt) is thus positioned to intersect at about the same point in space, which can be referred to as a rotation point. A camera is thus mounted to a system such that the rotation point is positioned along the camera's lens axis, where that lens axis coincides with the roll axis. In situations where the camera's center of mass is positioned along the lens axis but is not near where the lens axis intersects the tilt axis, the camera can be moved using tilt motor mount 130 and mounting frame 128.

FIG. 5 shows tilt motor 104 with mounting frame 128. This figure is looking from an interior side outward, with roll motor 102 removed. Mounting frame 128 is shown in more detail. Mounting frame 128 features two long sides (oriented horizontally, as drawn) and two short sides (oriented vertically, as drawn). The long sides feature surfaces that are angled relative to one another, such that the surfaces flare away from the roll motor. The angles of the surfaces are visible in FIG. 5, and the angles are present to facilitate attaching tilt motor 104 to mounting frame 128. By including angles on mounting frame 128 with complementary angled surfaces on tilt motor mount 130, tilt motor mount 130 can only be coupled with mounting frame 128 by sliding it onto mounting frame 128 (e.g., from left to right or right to left as drawn). Once tilt motor mount 130 is slidable coupled with mounting frame 128, tightening lever 132 can be put into a lock position, as shown in FIG. 5. By lifting tightening lever 132, tilt motor mount can slide along mounting frame 128 until a desired position for camera 108 is achieved. Tightening lever 132 works by creating pressure that squeezes mounting frame 128, thus increasing static friction forces such that tilt motor 104 is held in place relative to mounting frame 128.

Figures 6, 7, 8:
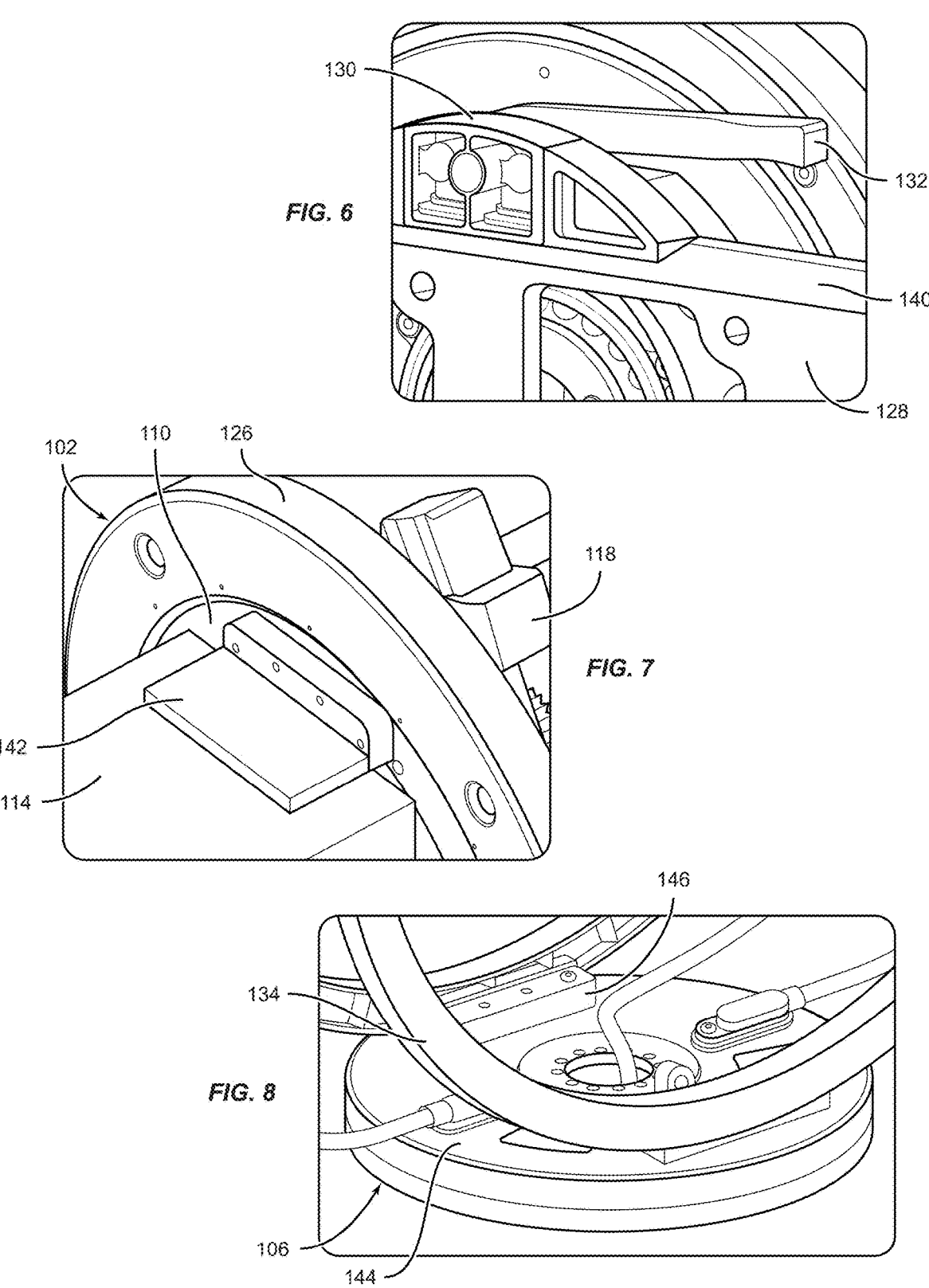
FIG. 6 shows a closer view of a tightening lever.
FIG. 7 shows a closer view of a back side of a camera system.
FIG. 8 shows a closer view of pan motor.

FIG. 6 shows a closer view of tightening lever 132. This also showcases slanted surface 140 of mounting frame 128. Slanted surface 140 is shown in contact with a complementary slanted surface on tilt motor mount. The same configuration is present on the opposite side of mounting frame 128, with the slanted surface angled in an opposite manner to slanted surface 140 so that tilt motor mount 130 can couple with mounting frame as a bracket.

Tilt motor 104 additionally includes features designed to facilitate coupling with pan motor frame 134. Tilt motor body 136 thus features coupling extensions 138. Coupling extensions 138 comprise holes to accommodate fasteners that hold pan motor frame 134 to coupling extensions 138. By this configuration, actuating each tilt motor causes that tilt motor's rotor to rotate relative to its casing, and because each mounting frame is coupled with a tilt motor rotor via tilt motor mount, actuation of both tilt motors causes the roll motor and camera to tilt.

FIG. 7 shows a closer view of a back side of camera system 100. This view shows how camera body 114 couples with roll motor rotor 110. Camera mounting bracket 142 couples with both camera body 114 and with roll motor rotor 110. In some embodiments, camera mounting bracket is formed as a part of camera body 114, while in other embodiments it can be coupled to camera body 114 by adhesive, weld, fastener, or any combination thereof.

FIG. 8 shows a closer view of pan motor 106. Pan motor 106 includes a pan motor body 144. Pan motor frame 134 couples with pan motor body 144 by pan motor frame mounting brackets 146, one of which is shown in FIG. 8. Because pan motor 106 is a PCB stator motor, it includes a center hole that can, as shown, allow electrical wiring to pass therethrough. Pan motor rotor 148 can include or be coupled with a feature that can facilitate attaching camera system 100 to some other component (e.g., a surface, a vehicle, or anything else a camera system of the inventive subject matter might need to be connected to).

Figure 9:
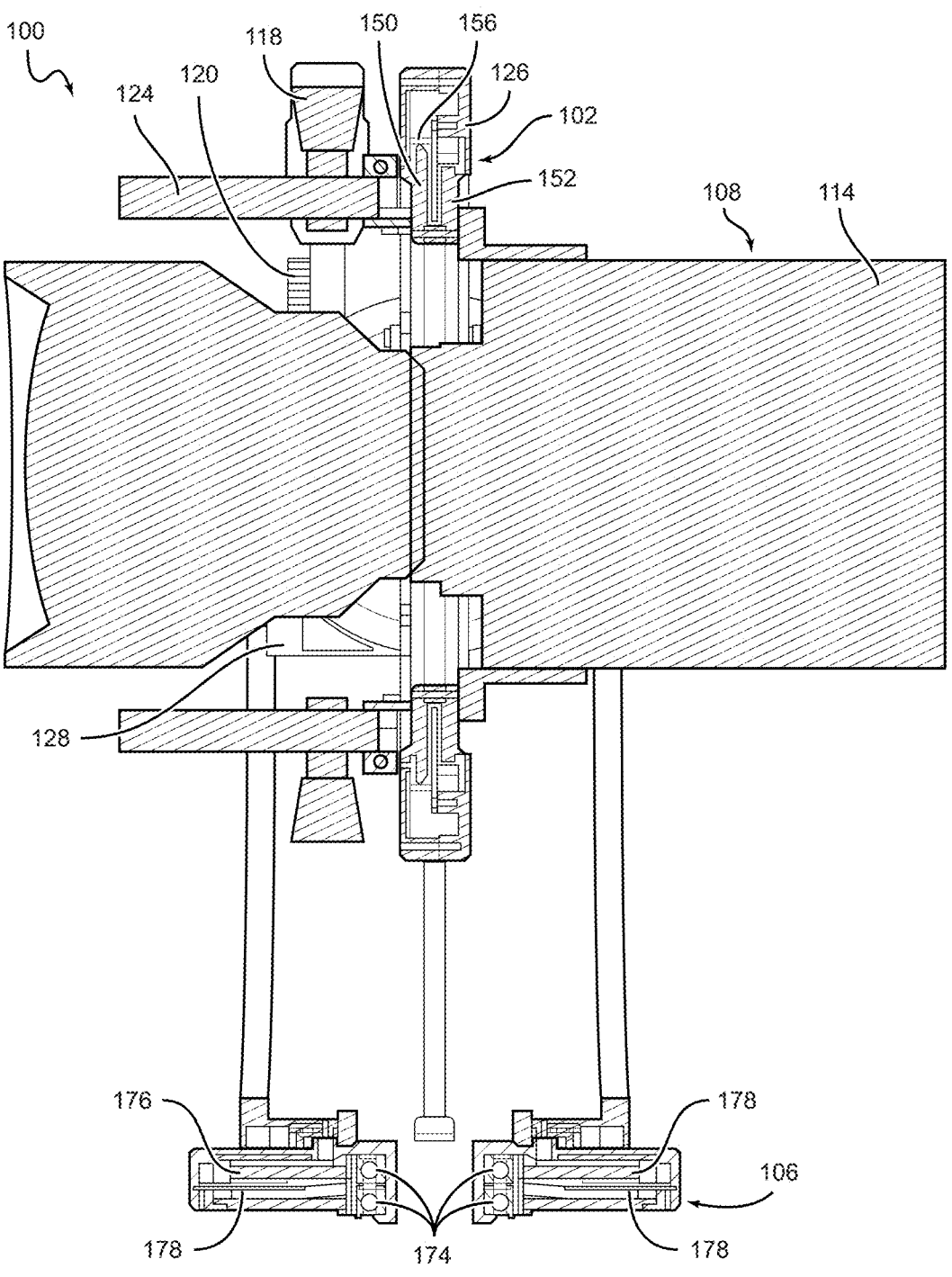
FIG. 9 shows a side, cutaway view of a camera system.

FIG. 9 shows a side, cutaway view of camera system 100. This view shows the internal configurations of roll motor 102 and pan motor 106. Starting with roll motor 102, this view shows roll motor PCB stator 150. Roll motor PCB stator 150 is disposed in a slot formed by roll motor rotor 152. Roll motor rotor 152 features magnets disposed on its surfaces that form the slot, and roll motor PCB stator is configured to magnetically interact with those magnets to cause roll motor rotor 152 to rotate relative to roll motor PCB stator 150, which is coupled with roll motor body 126.

Figure 10:
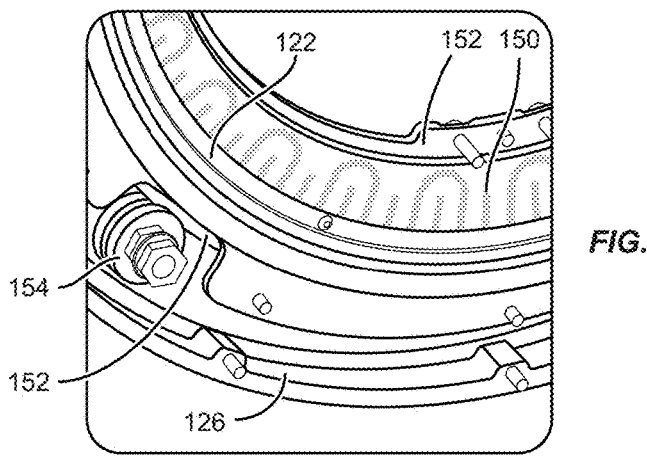
FIG. 10 shows a track wheel used to create a bearing between a rotor and a motor body.

To allow roll motor rotor 152 to rotate relative to roll motor body 126 with minimal friction, a bearing is disposed between roll motor rotor 152 and roll motor body 126. In some embodiments, the bearing comprises a set of track wheels circumferentially disposed around a portion of roll motor rotor 152. FIG. 10 shows an example of a track wheel used in a bearing of the inventive subject matter. This view shows roll motor PCB stator 150 along with track wheel 154 and roll motor rotor 152. Track wheel 154 features a groove that is sized and dimensioned to receive an outer edge of roll motor rotor 152. By including three or more track wheels that surround and interact with roll motor rotor 152, an externally disposed bearing is created that allows roll motor rotor 152 to rotate. FIG. 9, which shows a side view, makes the different parts of roll motor rotor 152 more apparent, including edge 156 that is configured to interact with track wheel 154 (along with other track wheels disposed similarly).

Pan motor 106 is shown at the bottom of FIG. 9. Pan motor 106 features two ball bearings 174. In some embodiments, only one ball bearing is included. Other types of bearings can be implemented as well, including roller bearings. Pan motor rotor 176 is able to rotate freely about ball bearings 174, where pan motor rotor 176 is configured to be driven by pan motor PCB stator 178.

Figure 11:
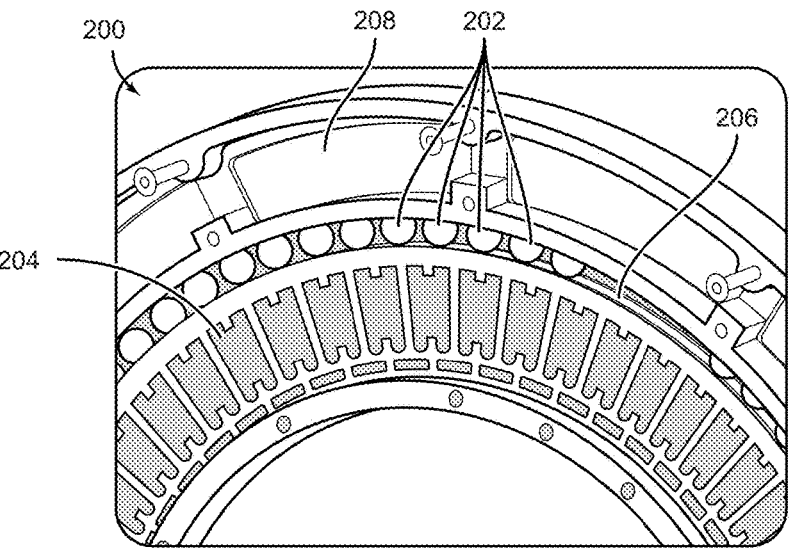
FIG. 11 shows a camera system having such an alternative bearing configuration.
Figure 12:
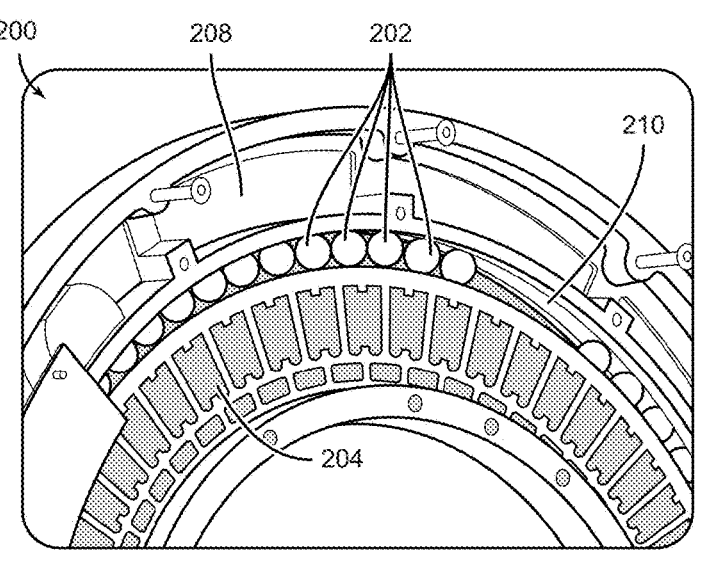
FIG. 12 shows how the alternative bearing configuration creates a ball bearing.

In some embodiments, the bearing implemented between the roll motor rotor and the roll motor body is a ball bearing. FIGS. 11 and 12 show a camera system 200 having such an alternative bearing configuration. This configuration features a ball bearing that is created by introducing ball bearing elements 202 in between an exterior edge of one side of the rotor 204, where the exterior edge features a groove 206 that is configured to entrap bearing elements 202 as shown in FIG. 11. FIG. 12 shows that an interior edge of casing piece 208 is also configured to interact with bearing elements 202 to create a ball bearing that allows rotor 204 to rotate relative to casing piece 208. Interior edge of casing piece 208, as shown in FIG. 12, also includes a groove 210 that entraps bearing elements 202 to create a ball bearing. As with other embodiments described in this application, rotor 204 is configured with two halves, such that a PCB stator can be disposed therebetween. The PCB stator does not move relative to casing piece 208, which thus allows rotor 204 to rotate relative to the PCB stator. These elements are shown in other figures in this application and apply equally to FIGS. 11 and 12, which differ only in the type of bearing element implemented to allow rotor 204 to rotate.

Figures 13, 14, 15:
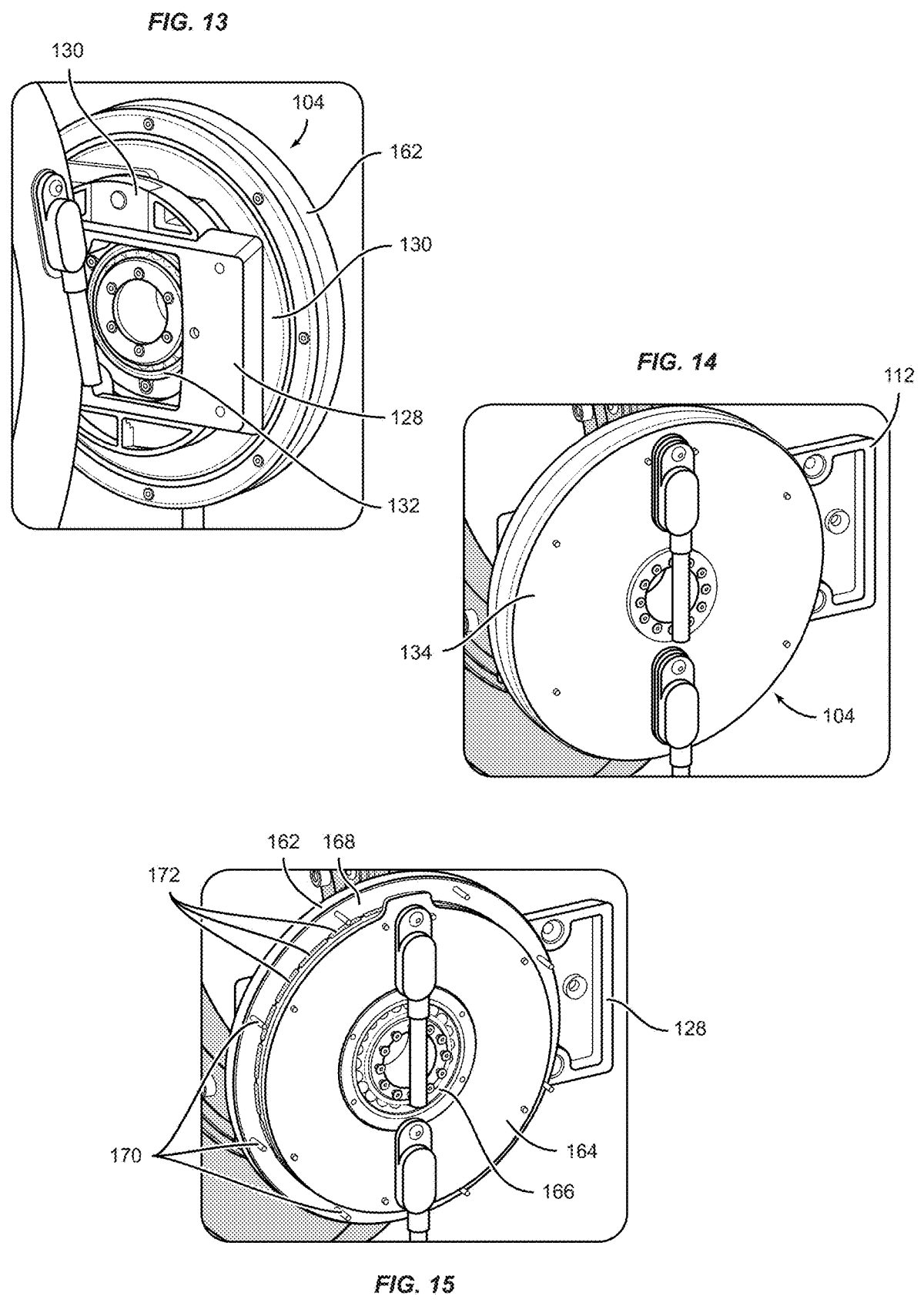

Tilt motors 104, like roll motor 102, are also PCB stator motors and are configured more typically with bearings within their rotors. FIG. 13 shows a tilt motor 104 from an interior perspective, showing tilt motor rotor 158 mounted around at least one interior ball bearing 160. Tilt motor rotor 158 is driven by a PCB stator that fits into a slot created by two portions of tilt motor rotor 158, where each portion of tilt motor rotor 158 has magnets affixed thereto that are configured to interact with induced magnetism in the tilt motor's PCB stator during motor operation.

Tilt motor 104 is shown with tilt motor rotor 158 coupled to mounting frame 128 via tilt motor mount 130 (as described above). Thus, operation of both tilt motors causes roll motor 102 to tilt, which, in turn causes camera 108 to tilt. To bring about smooth tilting while minimizing torque on roll motor 102, two tilt motors are to be implemented (as shown in, e.g., FIGS. 1 and 2). With a tilt motor positioned on either side of roll motor 102, and each tilt motor coupled with roll motor 102 by mounting frames, both tilt motors 104 working together can more easily cause roll motor 102 to tilt without resulting in undue stress resulting from twisting roll motor 102 as a tilt is performed.

FIG. 14 shows the same tilt motor as FIG. 13 from an exterior perspective. From this view, tilt motor body 162 is visible. Tilt motor 104 is shown with two cables connected to it. Those cables can deliver power, data, act as I/O, and so on. For example, one or more cables can be connected to a control console, a power supply, or both. All connectors shown in the figures comprise a bus power system that bundles power and a multi-point control bus (e.g., CAN or RS-485). All motors of the inventive subject matter operate via single control bus, and thus motors need not be present for other motors to operate. This design allows users to reconfigure systems of the inventive subject matter by removing motors to reconfigure a system.

FIG. 15 shows the tilt motor from FIG. 14 with a portion of tilt motor body 162 removed. Behind that portion of tilt motor body 162 is tilt motor control PCB 164. Tilt motor control PCB 164 can include electronics necessary to drive tilt motor 104. From this view, tilt motor bearing 166 is visible, too. Tilt motor magnets 172 are visible on tilt motor rotor 158, and adjacent to those components is tilt motor PCB stator 168.

Figures 16, 17, 18:
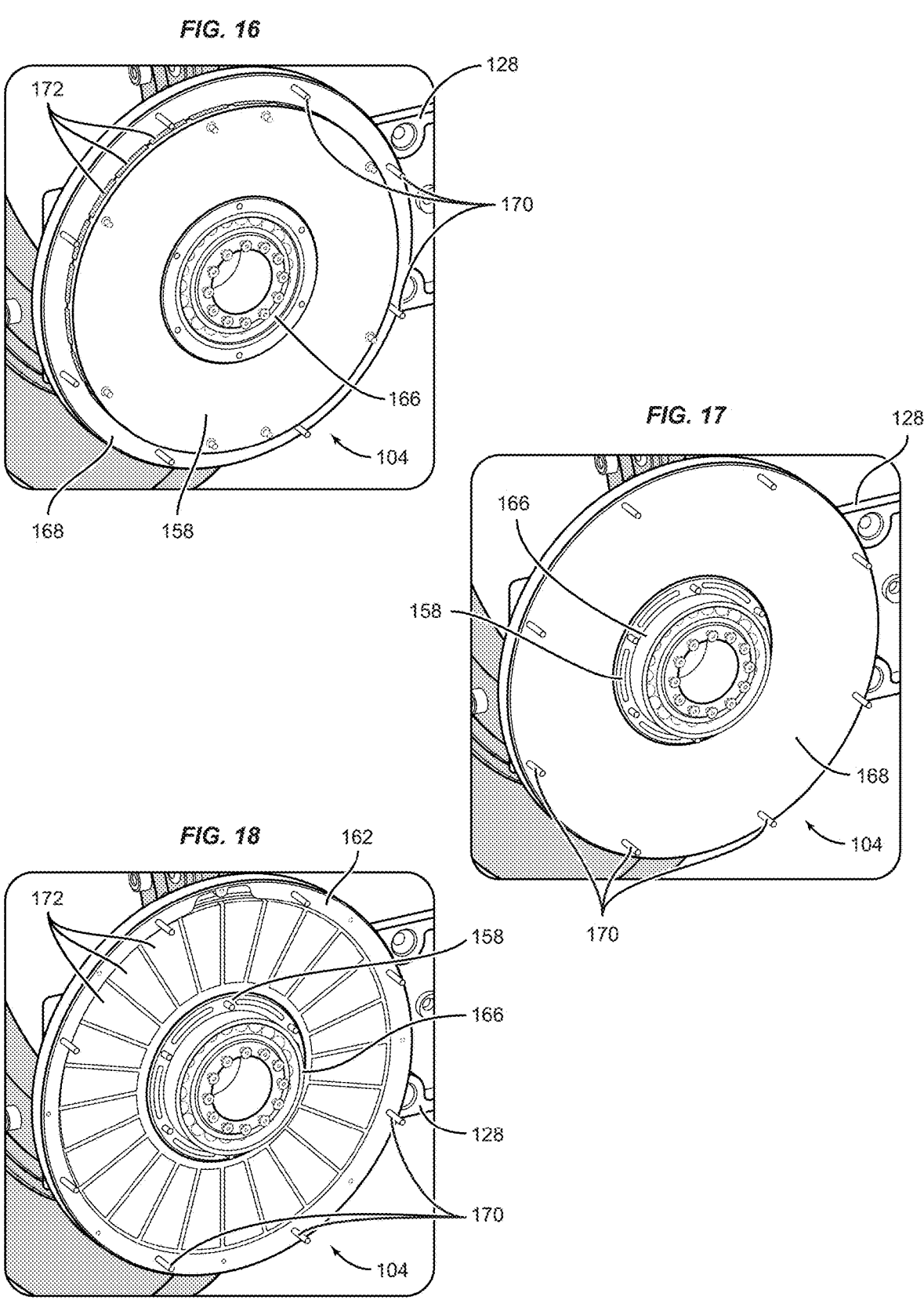
FIG. 16 shows tilt motor PCB stator.
FIG. 17 shows a portion of tilt motor rotor with its associated magnets.
FIG. 18 shows tilt motor magnets are distributed.

FIG. 15 shows the tilt motor from FIG. 15 with tilt motor control PCB 164 removed. This shows tilt motor rotor 158 and makes tilt motor bearing 166 more easily visible. FIG. 16 shows tilt motor 104 with a first portion of tilt motor rotor 158 removed, showing tilt motor PCB stator 168 more clearly. In FIG. 17, tilt motor 104 is shown with tilt motor PCB stator 168 removed, which shows a second portion of tilt motor rotor 158 along with tilt motor magnets 172. Tilt motor PCB stator 168 is coupled with tilt motor body 162 (both first and second portions, where only the second portion is shown in FIG. 17) by, e.g., screws 170. Finally, in FIG. 18, tilt motor 104 is shown with tilt motor PCB stator 168 hidden, which shows off the distribution of tilt motor magnets 172. Each magnet is formed as a portion of an annulus and is disposed circumferentially about a center point. Any set of magnets coupled with a rotor described in this application can abide by this description.

Figure 19:
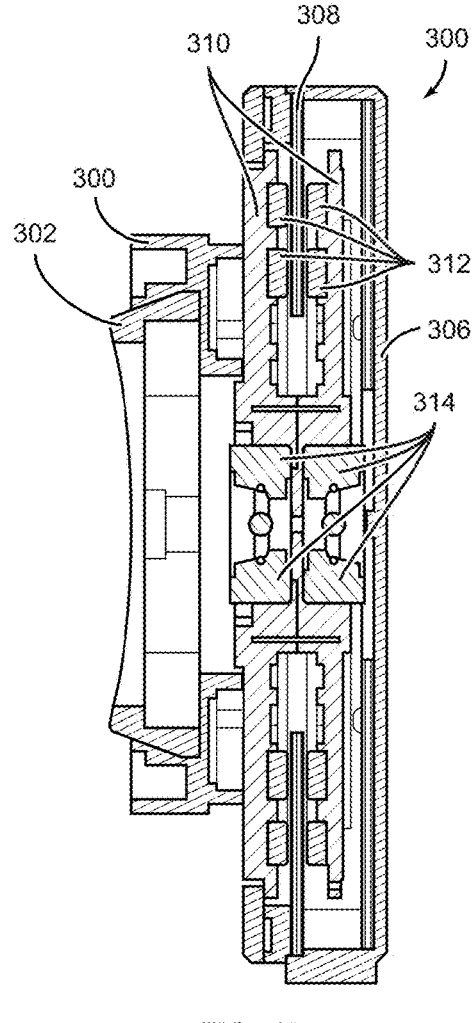
FIG. 19 shows a side cutaway view of a tilt motor.

FIG. 19 shows an isolated cutaway view of an embodiment of a tilt motor with an associated mounting frame. Tilt motor 300 is shown coupled with tilt motor mount 302, which is in turn adjustably coupled with mounting frame 304. Tilt motor 300 comprises tilt motor body 306, and tilt motor body 306 helps to form an interior portion. Within that interior portion, tilt motor PCB stator 308 is fixedly coupled to tilt motor body 306. This view also shows the configuration of tilt motor rotor 310, which has two sides to it (a left side and a right side, as drawn). The two sides of tilt motor rotor 310 form a slot, into which tilt motor PCB stator 308 extends. By selectively activating tilt motor PCB stator 308, tilt motor magnets 312 interact with the magnetic fields generated by tilt motor PCB stator 308, causing tilt motor rotor 310 to rotate relative to tilt motor body 306. Tilt motor rotor 310 couples with tilt motor body 306 by bearings 314.

Figure 20:
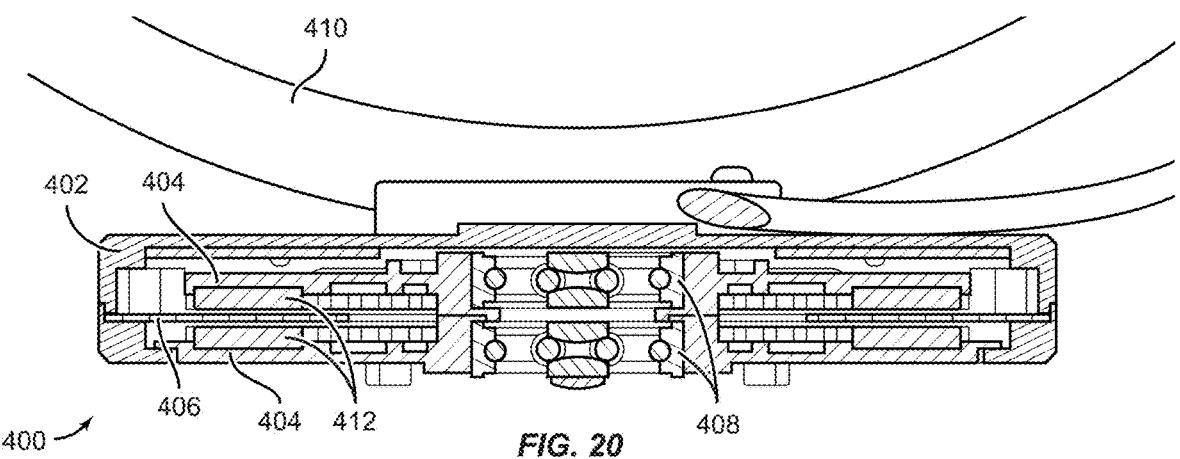
FIG. 20 shows a side cutaway view of a pan motor.

FIG. 20 shows an isolated cutaway view of a pan motor of the inventive subject matter. Generally speaking, pan motor 400 comprises pan motor body 402, pan motor rotor 404, pan motor PCB stator 406, and pan motor bearings 408. As drawn, pan motor body 402 creates a top surface of pan motor 400, while pan motor rotor 404 creates a bottom surface of pan motor 400. Pan motor rotor 404 includes magnets 412, which interact with induced magnetic fields created by pan motor PCB stator 406, which causes pan motor rotor 404 to rotate relative to pan motor body 402. Thus, pan motor rotor 404 can be coupled with a surface or structural element about which pan motor 400 should rotate. Thus, pan motor body 402 couples with pan motor frame 410, which in turn can couple with tilt motors (not shown). Pan motors of the inventive subject matter, like roll motors and tilt motors, include control PCBs that include hardware elements necessary to drive and, in some embodiments, control the motor.

Thus, specific systems and methods directed to camera control and stabilization systems have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A camera head system, comprising:
a roll motor configured as an annulus having an open center portion, wherein the roll motor comprises a printed circuit board (PCB) roll motor stator and a roll motor rotor;
wherein the roll motor rotor extends at least partially into the open center portion;
wherein the roll motor rotor is enabled to rotate by a set of bearings mounted within the roll motor and disposed circumferentially around the roll motor rotor;
a tilt motor, wherein the tilt motor comprises a tilt motor stator;
wherein the tilt motor is coupled with the roll motor by a tilt motor mounting frame;
a pan motor, wherein the pan motor comprises a pan motor stator; and
wherein the pan motor is coupled with the tilt motor by a pan motor frame.

2. The camera system of claim 1, wherein the roll motor rotor comprises a slot into which the roll motor stator extends.

3. The camera system of claim 1, wherein each bearing of the set of bearings is configured as a track wheel that is sized and dimensioned to receive an exterior edge of the roll motor rotor.

4. The camera system of claim 1, wherein the tilt motor is adjustably coupled with the tilt motor mounting frame.

5. A camera head system, comprising:
a roll motor having a roll motor rotor and a roll motor stator, wherein the roll motor rotor is formed as an annulus to create an open center portion;
wherein the roll motor rotor is enabled to rotate by a set of bearings mounted within the roll motor and disposed circumferentially around the roll motor rotor a tilt motor, wherein the tilt motor comprises a PCBtilt motor stator;
wherein the tilt motor is coupled with the roll motor;
a pan motor, wherein the pan motor comprises a PCBpan motor stator; and
wherein the pan motor is coupled with the tilt motor by a pan motor frame.

6. The camera system of claim 5, wherein the roll motor rotor is at least partially disposed within a roll motor casing.

7. The camera system of claim 5, wherein the roll motor rotor comprises a slot into which the roll motor stator extends.

8. The camera system of claim 5, wherein each bearing of the set of bearings is configured as a track wheel that is sized and dimensioned to receive an exterior edge of the roll motor rotor.

9. The camera system of claim 5, wherein the tilt motor is adjustably coupled with the roll motor by a tilt motor mounting frame.

10. The camera system of claim 5, further comprising a second tilt motor attached to an opposite side of the roll motor from the tilt motor.

* * * * *